United States Patent [19]

Finzer

[11] 4,216,366

[45] Aug. 5, 1980

[54] RESISTANCE WELDER WITH A CUTTER

[76] Inventor: Heinz Finzer, Industriestrasse 9, 7880 Säckingen 11, Fed. Rep. of Germany

[21] Appl. No.: 897,650

[22] Filed: Apr. 18, 1978

[30] Foreign Application Priority Data

Apr. 19, 1977 [DE] Fed. Rep. of Germany ....... 2717266

[51] Int. Cl.$^2$ ............................................. B23K 11/00

[52] U.S. Cl. .................................. 219/78.15; 219/79; 219/103

[58] Field of Search ................. 219/78.15, 79, 80, 103

[56] References Cited

U.S. PATENT DOCUMENTS

| | | | |
|---|---|---|---|
| 2,024,597 | 12/1935 | Pfeiffer . | |
| 3,634,934 | 1/1972 | Fitzgerald | 219/103 X |
| 4,048,461 | 9/1977 | Kopf | 219/79 X |

FOREIGN PATENT DOCUMENTS

| | | |
|---|---|---|
| 951328 | 10/1956 | Fed. Rep. of Germany . |
| 1012711 | 7/1957 | Fed. Rep. of Germany . |
| 1440549 | 4/1971 | Fed. Rep. of Germany . |
| 2454804 | 5/1976 | Fed. Rep. of Germany . |
| 2232059 | 12/1974 | France . |
| 1413738 | 11/1975 | United Kingdom . |

*Primary Examiner*—E. A. Goldberg
*Attorney, Agent, or Firm*—Oblon, Fisher, Spivak, McClelland & Maier

[57] ABSTRACT

A welding machine for the continuous welding of spot contacts on a support material is provided wherein the contact material in the form of wire, tape or sectional shape is supplied to a cutting tip, along a path parallel to the welding electrode, and is sheared off by a cutter movable at a right angle to the welding electrode, so that the contact "pill" is pushed into the gap formed between the welding electrode and the support material.

12 Claims, 7 Drawing Figures

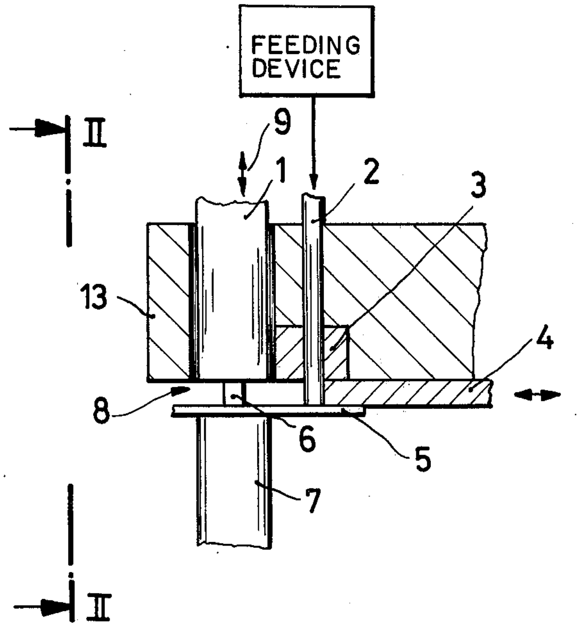
Fig.1
Fig.2
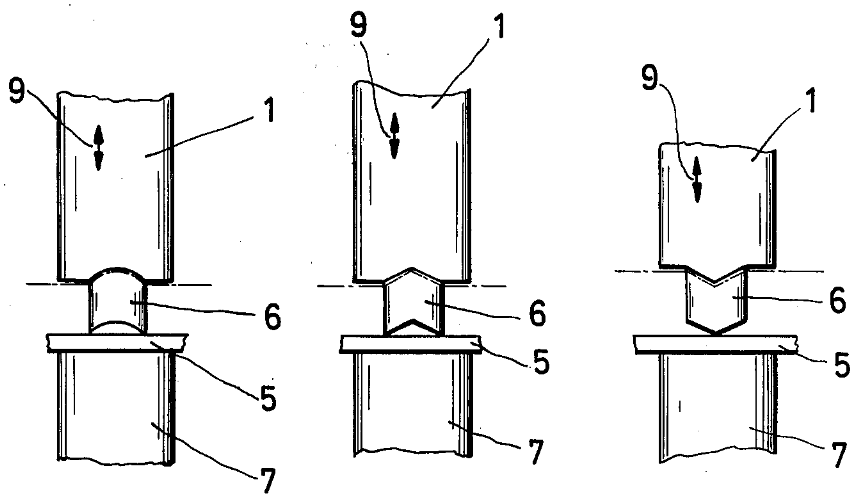

RESISTANCE WELDER WITH A CUTTER

BACKGROUND OF THE INVENTION

1. Field Of The Invention

The present invention relates to a welding machine for the continuous welding of spot contacts on a support material whereby contact material in the form of wire, tape or sectional shape is gradually supplied to a cutting tip, is sheared off with the help of a cutter and the obtained contact "pill" is pushed into the gap between a welding electrode and the support material which is supported by a counter-electrode which is flush with the welding electrode.

2. Brief Description Of The Prior Art

A welding machine of this kind is known in which the contact material is supplied at a right angle to the welding electrode and sheared off by means of the welding electrode itself and, by doing so, is placed, at the same time, on the support material. Difficulties ensue with this machine when, for example, the contact material has a round section since, after having been shorn off, it rests with its jacket surface on the contact material and, therefore, creates unfavorable geometric conditions for a round contact, whereby the cross-section of the weld corresponds only approximately to a circular cross-section and is frequently freely overlapped by the staved material contact. Another disadvantage lies in the fact that the welding electrode itself is exposed to increased wear by being used as a cutter and that measures must be taken so that the welding electrode maintains a sufficient insulating distance for the welding process from the contact material or the cutting tip, respectively.

SUMMARY OF THE INVENTION

Accordingly, it is an object of the present invention to provide a welding machine of the type described in the introduction which saves the welding electrode and, particularly, guarantees a geometric position of the welding contact to the support material which is favorable for sectional contact material.

This object and others are achieved by supplying the contact material to the cutting tip in parallel relation to the welding electrode and providing a cutter therefor which is flush with the gap at a right angle to the welding electrode. In this manner, the shearing-off of the contact material is effected independently of the electrode and, additionally, the contact material is inserted into the gap between the welding electrode and the support material with its cross-sectional surface as the base.

It is of special advantage when the cutting edges of the cutting tip and cutter are sectional and the welding electrode is provided with a corresponding contact section so that, at the points important for the welding process, areas can be produced with a high or low welding resistance. Additionally, such sections can simultaneously be used as a guiding help when inserting the contact "pill" into the gap. A particularly favorably cut section is a roof-shaped or rounded, hollow section with the generatrix disposed parallel to the direction of insertion of the cutter.

In order to stabilize the guidance, the cutter can be provided with a supporting section corresponding essentially to the semi-section of the contact material and, if required, it can be guided in a guide with a width corresponding to the cross-section of the contact material.

In order to fix the position of the contact "pill" under the welding electrode, a counter-holder, which can be inserted in the appropriate gap, is suitable. However, it is more expedient when the contact profile of the welding electrode is conically tapered in the direction of insertion so that the contact "pill" when inserted by the cutter between the welding electrode and the support material, is self-locked.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference numerals designate like or corresponding parts throughout the several views and in which:

FIGS. 1, 3, 4 and 5 show the welding range of a welding machine according to the present invention in the form of a partial cross-sectional view;

FIG. 2 shows a front view of preferred sectional shapes for the contact "pill" taken along the line II—II of FIG. 1;

DETAILED DESCRIPTION OF PREFERRED EMBODIMENTS

Figure 7:
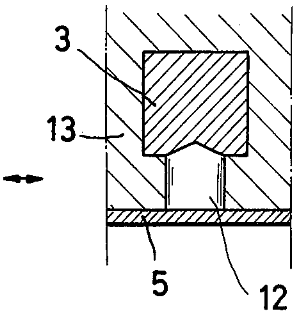
FIG. 7 is a partial cross-section taken along the line VII—VII in FIG. 3.

FIG. 1 shows the principle of the invention in its most simplified implementation. With the help of a feeding device 20, a wire-shaped contact material 2 is supplied to a cutting gap by a cutting tip 3 in which a cutter 4 is movable in the direction of the indicating arrow and with which a piece of the contact material 2, corresponding to the height of the cutting gap, is inserted into a gap 8, representing an extension of the cutting gap, as the contact "pill" 6. This gap 8 is thus formed between a welding electrode 1, movable according to the arrow 9, and a support material 5 which, in its turn, rests on a counter-electrode 7 and serves, in this case, the purpose of a stop for the contact material 2 and forms, in this way, the bottom of a guide duct 12 (FIG. 7) supporting the cutter 4. The support material 5 is supplied, vertically to the drawing plane, through the gap 8. The contact "pill" 6 is held, while being wedged between the welding electrode 1 and the support material 5, and welded.

In order to achieve an optimum welding contact between the support material 5 and the contact "pill" 6, the latter is given a suitable section which guarantees line or spot contact with the column support. Particularly, suitable profiles are shown in FIG. 2, according to which the "pill" is provided, on the side towards the support material, with a concave, roof-shaped or rounded contact side or with an opposite profile, i.e., with a convex contact surface. The other, or the opposite side towards the welding electrode, is sectioned in the same direction. The sectional shape selected here can, in the range of the correspondingly sectioned welding electrode 1, as well as in the range of the also correspondingly sectioned cutting tip 3, serve the purpose of a guide for the insertion of the contact "pill" into the gap 8, as this is shown in the FIGS. 3 to 5 and particularly in the cross-sectional representation according to FIG. 7.

Figure 3:
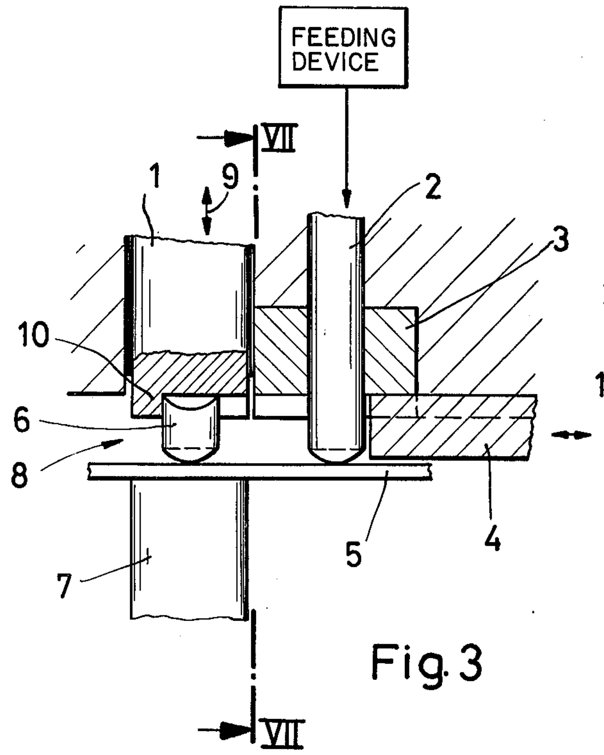

In order to fix the position of the contact "pill" 6 in the gap 8, a step 10 can be provided at the welding electrode 1, as shown in FIG. 3. Instead of using such a stop, it would also be possible to taper the contact profile of the welding electrode 1 in the feeding direction of the contact "pill" 6 in such a manner that it is self-locked in gap 8 under the feeding device by the cutter 4.

Figure 4:
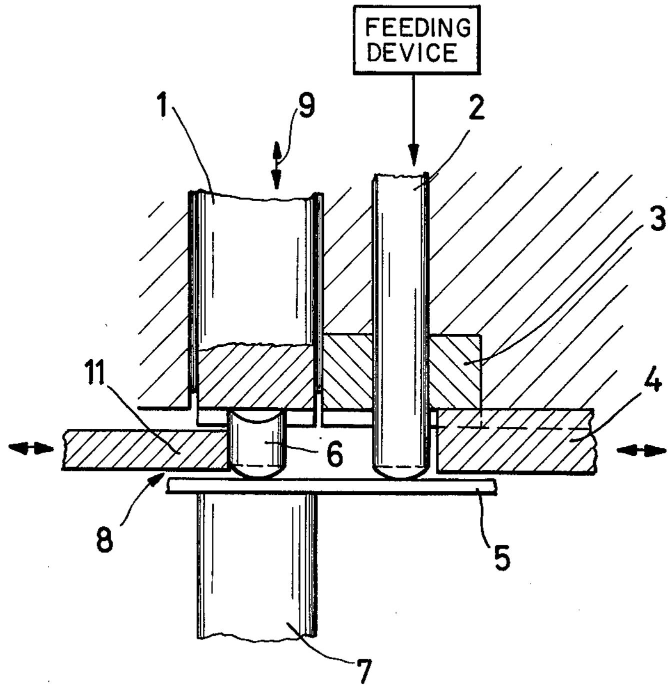
Figure 5:
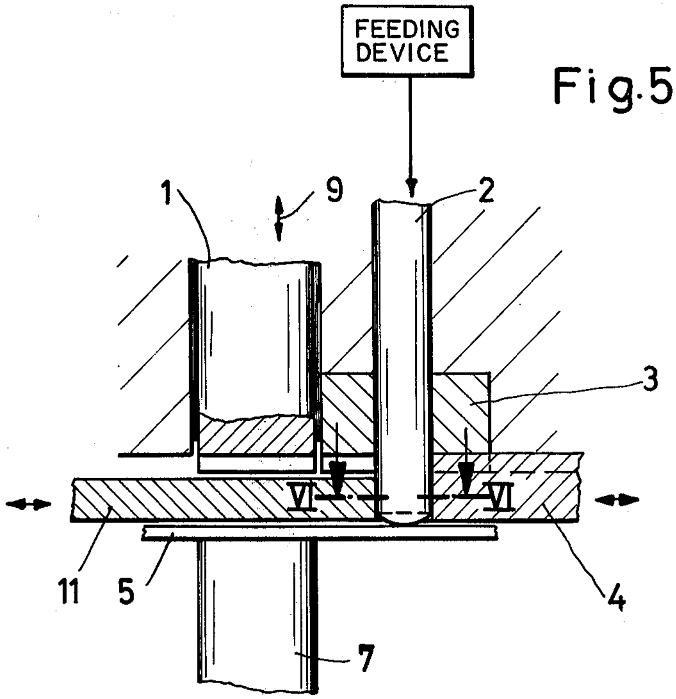

Another possibility of the fixing of the position of the contact "pill" consists, instead of such tapering and of providing the stop 10, in using a counter-holder, which can be inserted into gap 8, as shown in FIG. 4. Such a counter-holder 11 can be moved forward, as indicated in FIG. 5, to such an extent that it is moved up to the contact material 2 and takes over, together with the cutter 4, the insertion of the contact "pill" into the gap 8 as a counter-support.

Figure 6:
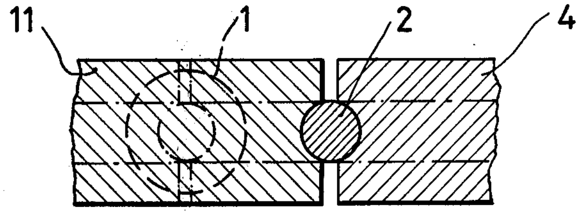
FIG. 6 is a sectional view taken along the line VI—VI in FIG. 5.

It is particularly advantageous when the contact material 2 or the contact "pill" 6 is semi-laterally encompassed by the cutter 4 and, if applicable, by the counter-holder 11, as this can be noticed in FIG. 6. If the cutter 4 is given the cross-section, as indicated by broken lines in FIG. 6, corresponding to a guide duct 12 shown in FIG. 7, a counter-holder can be eliminated owing to the better guiding achieved in this way.

The upright serving the purpose of the guide of the welding electrode 1 and of the cutter 4 is indicated at 13.

Obviously, many modifications and variations of the present invention are possible in light of these teachings. It is therefore to be understood that, within the scope of the appended claims, the invention can be practiced otherwise than as specifically described herein.

What is claimed as new and desired to be secured by Letters Patents of the United States is:

1. A welding machine comprising:

a welding electrode movably disposed along a given line;

a support material disposed in the path of said welding electrode;

a cutter movable at right angles to said given line of movement of said welding electrode;

a counter-electrode disposed opposite said support material from said welding electrode and supporting said support material; and means including a cutting tip for gradually supplying an elongated contact material along a path parallel to said given line of movement of said welding electrode, through the cutting tip, to said support material, said contact material being supplied between said cutter and said welding electrode, the cutting edges of the cutting tip and of the cutter having profiles corresponding to one another and the welding electrode being provided with a contact profile corresponding to that of the cutting tip;

whereby said contact material is sheared off by said cutter into a contact pill and has a sheared surface whose profile is complementary with said contact profile of said welding electrode.

2. A welding machine according to claim 1, wherein said cutter is shaped so that the sectional profile of the contact "pill" is an arched, hollow section with the generatrix in parallel to the direction of insertion of the cutter.

3. A welding machine according to claim 2, wherein the sectional profile is concave to the support material.

4. A welding machine according to claim 1, wherein the sectional profile of the contact "pill" is convex to the support material.

5. A welding machine according to claim 1 wherein the contact profile of the welding electrode has an insertion stop for the contact "pill".

6. A welding machine according to claim 1 wherein the contact profile of the welding electrode is conically tapered in the direction of insertion.

7. A welding machine according to claim 1 further comprising a counter-holder insertable into a gap opposite said cutter as an insertion stop.

8. A welding machine according to claim 7, wherein the counter-holder is movable forward up to said contact material and can be actuated in the shearing and insertion direction at the same time with the cutter.

9. A machine according to claim 8, wherein said cutter and said counter-holder are provided with a supporting profile complementary with the axial semi-profile of the contact material.

10. A machine according to claim 8, wherein said cutter and said counter-holder have a width corresponding to the diameter of the contact material.

11. A welding machine according to claim 1 wherein a stop is provided as a limit for the feed movement of the contact material.

12. A welding machine according to claim 11, wherein said stop is formed by the support material.

* * * * *